United States Patent
Cybulskis

(10) Patent No.: US 12,281,030 B2
(45) Date of Patent: Apr. 22, 2025

(54) ON-SITE DESTRUCTION OF RECALCITRANT PERFLUOROALKYL SUBSTANCES BY MOLECULAR SIEVES

(71) Applicant: Viktor Cybulskis, North Syracuse, NY (US)

(72) Inventor: Viktor Cybulskis, North Syracuse, NY (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 0 days.

(21) Appl. No.: 18/593,151

(22) Filed: Mar. 1, 2024

(65) Prior Publication Data

US 2024/0199446 A1 Jun. 20, 2024

Related U.S. Application Data

(62) Division of application No. 17/529,738, filed on Nov. 18, 2021, now Pat. No. 11,945,732.

(Continued)

(51) Int. Cl.
*C02F 1/28* (2023.01)
*C02F 1/72* (2023.01)
(Continued)

(52) U.S. Cl.
CPC ................ *C02F 1/28* (2013.01); *C02F 1/725* (2013.01); *C02F 2101/30* (2013.01);
(Continued)

(58) Field of Classification Search
CPC .. C02F 1/28; C02F 1/281; C02F 1/725; C02F 1/78; C02F 2101/30; C02F 2101/36;
(Continued)

(56) References Cited

U.S. PATENT DOCUMENTS

| 2011/0171121 A1* | 7/2011 | Senderov | .............. C01B 39/026 |
| | | | 423/700 |
| 2020/0316560 A1* | 10/2020 | Distefano | ............ B01J 20/3007 |
| 2021/0346862 A1* | 11/2021 | Georgi | ................. B01J 20/3408 |

FOREIGN PATENT DOCUMENTS

| CN | 107265788 A | * | 10/2017 | ............. B01D 53/02 |
| CN | 210915723 U | * | 7/2020 | |
| WO | WO-2020089192 A1 | * | 5/2020 | .............. B01J 20/18 |

OTHER PUBLICATIONS

Prodinger, S. and Derewinski, M.A., 2020. Recent progress to understand and improve zeolite stability in the aqueous medium. Petroleum Chemistry, 60, pp. 420-436. (Year: 2020).*

(Continued)

*Primary Examiner* — Magali P Slawski
*Assistant Examiner* — Bernadette Karen McGann
(74) *Attorney, Agent, or Firm* — David L. Nocilly; Bond Schoeneck & King PLLC

(57) ABSTRACT

A two-stage treatment process for destroying per- and polyfluoroalkyl substances (PFAS) in an aqueous stream. The two-stage treatment process uses a combination of multifunctional crystalline molecular sieves, such as zeolites and zeotypes, to separate PFAS from the aqueous stream, catalytically decompose and defluorinate any PFAS molecules, and generate non-toxic waste products that are safe for disposal. The first stage includes adsorption of the PFAS within one of a pair of vessels containing porous, hydrophobic, hydrothermally stable molecular sieves, dehydration of the captured PFAS on the sieves, and catalytic ozonation of the captured PFAS molecules on the dried sieves. The second stage involves catalytic decomposition and neutralization of the ozonation results with one of a pair of vessels including a zeolite-supported CaO catalyst, catalytic oxidation of any toxic CO generated by the decomposition, and an acid wash for regeneration of the spent catalyst.

9 Claims, 2 Drawing Sheets

Related U.S. Application Data

Figure 1:
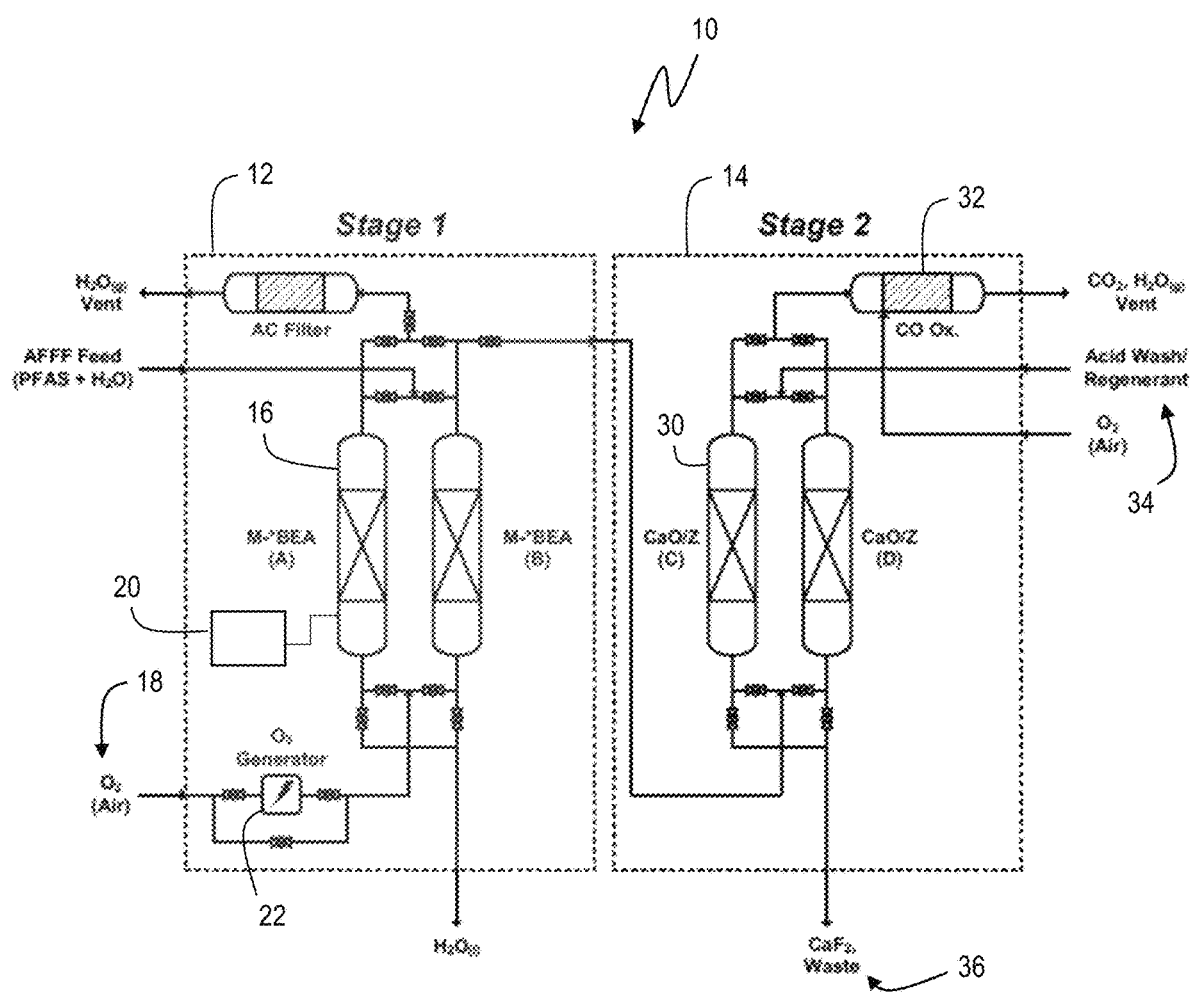

(60) Provisional application No. 63/115,105, filed on Nov. 18, 2020.

(51) Int. Cl.
  *C02F 101/30* (2006.01)
  *C02F 103/06* (2006.01)

(52) U.S. Cl.
  CPC ...... *C02F 2103/06* (2013.01); *C02F 2201/78* (2013.01); *C02F 2301/066* (2013.01); *C02F 2303/14* (2013.01)

(58) Field of Classification Search
  CPC ............ C02F 2103/06; C02F 2201/008; C02F 2201/78; C02F 2301/066; C02F 2303/14
  See application file for complete search history.

(56) References Cited

OTHER PUBLICATIONS

Machine generated translation of CN-210915723-U (Year: 2020).*
Machine generated translation of CN-107265788 (Year: 2017).*

* cited by examiner

ON-SITE DESTRUCTION OF RECALCITRANT PERFLUOROALKYL SUBSTANCES BY MOLECULAR SIEVES

CROSS-REFERENCE TO RELATED APPLICATIONS

The present application is a divisional of U.S. Nonprovisional application Ser. No. 17/529,738, filed on Nov. 18, 2021, which claimed priority to U.S. Provisional Application No. 63/115,105 filed on Nov. 18, 2020, both of which are hereby incorporated by reference in their entireties.

BACKGROUND OF THE INVENTION

1. Field of the Invention

The present invention relates to the treatment of hazardous compounds and, more specifically, to a system for the complete on-site destruction of persistent perfluoroalkyl substances (PFAS) along with treatment by-products to generate non-hazardous waste for disposal.

2. Description of the Related Art

Per- and polyfluoroalkyl substances (PFAS) are a family of human-made chemicals that are found in a wide range of products used by consumers and industry. The widespread use of PFAS and their ability to remain intact in the environment means that over time PFAS levels from past and current uses can result in increasing levels of environmental contamination. Accumulation of certain PFAS has also been shown through blood tests to occur in humans and animals. While the science surrounding potential health effects of this bioaccumulation of certain PFAS is developing, evidence suggests it may cause serious health conditions. As governmental agencies are beginning to promulgate safety standards and regulations regarding PFAS, there is a need in the art for an approach that can destroy PFAS from aqueous streams.

BRIEF SUMMARY OF THE INVENTION

The present invention is a system and a process for the complete destruction, commonly referred to as mineralization, of per- and polyfluoroalkyl substances (PFAS) found in aqueous film-forming foams (AFFF), biosolids, and contaminated groundwater. More specifically, the present invention comprises two stages that utilize a combination of multifunctional crystalline molecular sieves, such as zeolites and zeotypes, to separate PFAS from aqueous streams, catalytically decompose and defluorinate PFAS molecules, and generate non-toxic waste products that are safe for disposal. The invention can be implemented as a mobile unit, such as a portable apparatus attached to trailer, or as a dedicated treatment facility for on-site destruction of PFAS.

In a first embodiment, the present invention is an apparatus for destroying recalcitrant perfluoroalkyl substances. The apparatus has a first vessel having an adsorption bed formed from a porous, hydrophobic, hydrothermally stable molecular sieve. A source of compressed air, either ambient or externally supplied, is coupled to the first vessel for introducing compressed air into the first vessel. A source of heat is coupled to the first vessel and can selectively increase the temperature of the first vessel to a first temperature between 80 and 120 degrees Celsius and to a second temperature of at least 150 degrees Celsius. An ozone generator is used to provide a source of ozone from either the compressed ambient air or externally supplied, purified oxygen. This source of ozone is coupled to the first vessel for introducing ozone into the first vessel. A second vessel is coupled to the first vessel to receive any off-gases from the first vessel and includes a catalytic bed formed from a zeolite-supported CaO catalyst. A catalytic oxidizer is coupled to the second vessel and having a metal-oxide supported noble catalyst operating at a temperature of between 200 and 350 degrees Celsius. A source of a mineral acid is coupled to the second vessel. The porous, hydrophobic, hydrothermally stable molecular sieve comprises high-silica zeolite (Si/M molar ratio >6, where M=metal) of the *BEA topology with a high concentration of well-defined, low-defect (i.e., fully-coordinated $(SiO)_4M$ and $SiO_4$) molecular binding sites relative to partially-hydrolyzed open sites $((OH)_x-M-(OSi)_{3-x}, (SiOH)_x)$. The *BEA zeolite structure includes tetravalent metal heteroatoms. The zeolite-supported CaO catalyst of the second vessel is impregnated with a $H_2O$-soluble calcium precursor. The $H_2O$-soluble calcium precursor comprises calcium acetate $(Ca(C_2H_3O_2)_2)$. The metal-oxide supported noble catalyst is selected from group consisting of Pt, Pd on $CeO_2$, and $Al_2O_3$. The mineral acid comprises HCl or $HNO_3$. The invention may further include a third vessel having a second adsorption bed formed from the porous, hydrophobic, hydrothermally stable molecular sieve and coupled to the source of compressed, the source of heat, and the source of ozone and a fourth vessel coupled to either of the first vessel or the third vessel to receive any off-gases, wherein the fourth vessel includes a second catalytic bed formed from the zeolite-supported CaO catalyst and is coupled to catalytic oxidizer and the source of a mineral acid.

The present invention also includes a method of destroying recalcitrant perfluoroalkyl substances. In a first step, the method includes feeding an aqueous stream containing PFAS to a first vessel containing an adsorption bed formed from a porous, hydrophobic, hydrothermally stable molecular sieve. In a next step, the method includes draining the aqueous stream from the first vessel and then introducing compressed air into the first vessel. The temperature of the adsorption bed is then raised to between 80 and 120 degrees Celsius until the adsorption bed is dry. The temperature of the adsorption bed is then increased to above 150 degrees Celsius and ozone is introduced into the first vessel. Any off-gases from the first vessel are provided to a second vessel having a catalytic bed formed from a zeolite-supported CaO catalyst. Any off-gases from the second vessel are oxidized with a catalytic oxidizer coupled to the second vessel and having a metal-oxide supported noble catalyst operating at a temperature of between 200 and 350 degrees Celsius. The method may also include the step of washing the catalytic bed of the second vessel with a mineral acid to dissolve any salt and the step of regenerating the catalytic bed of the second vessel with calcium impregnation. The porous, hydrophobic, hydrothermally stable molecular sieve comprises a silica zeolite having a silica to metal molar ratio greater than 6 and a *BEA topology with a higher concentration of fully-coordinated molecular binding sites than partially-hydrolyzed open sites. The *BEA zeolite structure includes tetravalent metal heteroatoms. The zeolite-supported CaO catalyst of the second vessel is impregnated with a $H_2O$-soluble calcium precursor. The $H_2O$-soluble calcium precursor comprises calcium acetate $(Ca(C_2H_3O_2)_2)$. The metal-oxide supported noble catalyst is selected from group consisting of Pt, Pd on $CeO_2$, and $Al_2O_3$. The mineral acid comprises HCl or $HNO_3$.

BRIEF DESCRIPTION OF THE SEVERAL VIEWS OF THE DRAWING(S)

Figure 2:
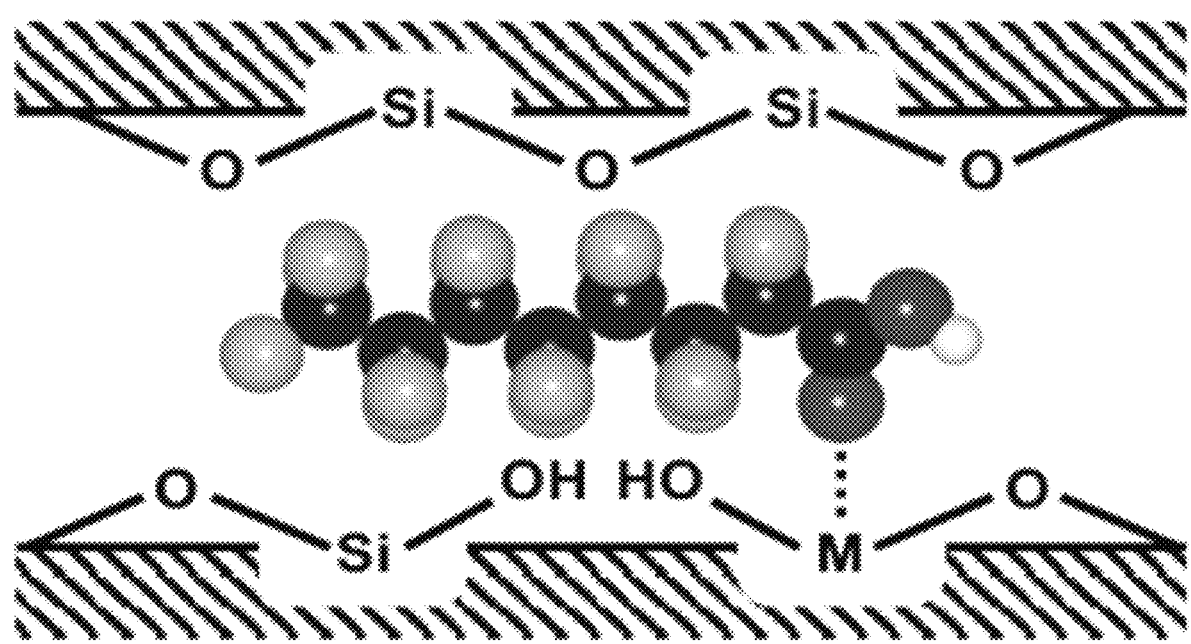

The present invention will be more fully understood and appreciated by reading the following Detailed Description in conjunction with the accompanying drawings, in which:

FIG. 1 is a process schematic of a system for destroying per- and polyfluoroalkyl substances (PFAS) according to the present invention; and FIG. 2 is an illustration of perfluorooctanoic acid (PFOA) adsorbed in the confining micropore of a hydrophobic metal-containing zeolite.

DETAILED DESCRIPTION OF THE INVENTION

Referring to the figures, wherein like numeral refer to like parts throughout, there is seen in FIG. 1 a system 10 for destroying per- and polyfluoroalkyl substances (PFAS) in an aqueous stream. System 10 comprises a first stage 12 and a second stage 14 that employ a combination of multifunctional crystalline molecular sieves, such as zeolites and zeotypes, to separate PFAS from aqueous streams, catalytically decompose and defluorinate PFAS molecules, and generate non-toxic waste products that are safe for disposal. System 10 can be configured as a mobile unit, such as a portable apparatus positioned on a towed trailer, for onsite treatment at a contaminated location, or as a dedicated treatment facility for destruction of PFAS generated at that location. First stage 12 and second stage 14 are interconnected to each other and the various components using conventional fluid piping and control valves as is known in the art and seen in FIG. 1.

First stage 12 commences with an adsorption phase where an AFFF or other PFAS-containing aqueous stream is fed to a bank of parallel vessels 16 (A, B) containing beds of porous, hydrophobic, hydrothermally stable molecular sieves operating in a swing cycle (i.e., adsorption-dehydration-catalytic ozonation) to enable near continuous water treatment. A high-silica zeolite (Si/M>6, where M=metal) of the *BEA topology with a high concentration of well-defined, low-defect (i.e., fully-coordinated $(SiO)_4M$ and $SiO_4$) molecular binding sites relative to partially-hydrolyzed open sites $((OH)_x\text{-}M\text{-}(OSi)_{3-x}, (SiOH)_x)$ is the preferred molecular sieve due to its confining pore size (~6 Å) that is comparable to major PFAS molecules, such as perfluorooctanoic acid (PFOA, ~6 Å×6 Å×12 Å). These properties allow size discrimination of PFAS from other molecules in the feed stream while excluding bulk $H_2O$ from the intra-crystalline void spaces within the molecular sieve. Additionally, the incorporation of tetravalent metal heteroatoms (e.g., Ti, Zr, Sn, Hf, etc.) into the *BEA zeolite structure (denoted M-*BEA) facilitates PFAS adsorption through coordination of the hydrophilic carboxylic (perfluoroalkyl acids) and sulfonic (perfluoroalkyl sulfonates) acid groups to the Lewis acidic metal center while maintaining charge neutrality of the hydrophobic framework and minimizing $H_2O$ adsorption, as seen in FIG. 2. The effluent $H_2O$ can be stored, sent for subsequent treatment, or recirculated back through the adsorption beds as required.

Upon reaching the PFAS saturation limit on M-*BEA in vessel A during the adsorption cycle, the liquid is drained from vessel A and the AFFF feed is routed to vessel B for a dehydration phase. Compressed ambient air is introduced to the bottom of vessel A from a source of compressed air 18 and the temperature of M-*BEA adsorbent bed is gradually increased to between 80-120° C. using a source of heat 20 to dry the molecular sieve while retaining the occluded PFAS. The effluent vapor may be first sent through an activated carbon (AC) filter to capture any volatile organic species, and then vented to the atmosphere.

Once the M-*BEA zeolite is dry a catalytic ozonation phase is commenced, where the temperature of the adsorbent bed is increased above 150° C. by the source of heat 20 and ozone ($O_3$) is introduced to the vessel from ambient air by means of an $O_3$-generator 22. $O_3$ treatment is an established technique for low temperature removal of organic template molecules and structure-directing cations from molecular sieves, such as zeolites, zeotypes, and meso-structured materials. Additionally, catalytic ozonation over various Lewis acidic metal oxides has been successful at removing groundwater pollutants, such as PFAS, pharmaceutical compounds, and other organics, from aqueous streams with up to 98% efficiency. For the present invention, it is anticipated that the incorporation of a metal heteroatom into the zeolite framework will be critical for catalytic ozonation by M-*BEA as these Lewis acid sites are expected to dissociatively adsorb molecular $O_3$ into the reactive $O_2^-$, $O_2^{-2}$, and ·OH surface species required to break C—F bonds in PFAS. The catalytic ozonation cycle has the potential to generate hazardous short-chained perfluorocarbon ($C_nF_{2n+2}$, $C_nF_{2n}$) and hydrogen fluoride (HF) by-products that require additional treatment.

Second stage 14 commences with a catalytic decomposition and neutralization phase where the off-gas from the catalytic ozonation cycle in first stage of the PFAS treatment process is fed to a bank of parallel vessels 30 (C, D) in second stage 14. Parallel vessels 30 (C, D) in second stage 14 contain beds of a zeolite-supported CaO catalyst, denoted as CaO/Z in FIG. 1, to catalytically decompose persistent perfluorocarbons and neutralize HF according to the proposed reactions:

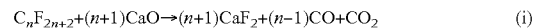

$$C_nF_{2n+2} + (n+1)CaO \rightarrow (n+1)CaF_2 + (n-1)CO + CO_2 \quad \text{(i)}$$

$$C_nF_{2n} + nCaO \rightarrow nCaF_2 + nCO \quad \text{(ii)}$$

$$HF + CaO \rightarrow CaF_2 + H_2O \quad \text{(iii)}$$

Physical mixtures of CaO and high-silica MOR zeolites or $Al_2O_3$ can achieve near complete decomposition of tetrafluoromethane ($CF_4$) at temperatures ranging from 650-700° C. The present invention utilizes a single CaO/zeolite (e.g., $SiO_2/Al_2O_3$ with Si/Al molar ratio >6) catalyst for perfluorocarbon decomposition and HF neutralization that is be prepared by impregnation with a $H_2O$-soluble calcium precursor, such as calcium acetate ($Ca(C_2H_3O_2)_2$), followed by drying and calcination in air.

Second stage 14 also include a catalytic oxidation phase to address any stoichiometric amounts of toxic CO that may be generated during the catalytic decomposition reaction over CaO/Z if higher molecular weight perfluorocarbons beyond $CF_4$ are produced during catalytic ozonation of PFAS in first stage 12, as shown in reactions (i) and (ii). Thus, the off-gas from catalytic decomposition vessels 30 of second stage 14 is sent through a low-temperature (200-350° C.) catalytic oxidizer 32 that uses a conventional metal oxide-supported noble catalyst, such as Pt or Pd on $CeO_2$ or $Al_2O_3$, to completely oxidize residual CO to $CO_2$ and $H_2O$.

Second stage 14 concludes with an acid wash 34 and regeneration phase where the short-chained perfluorocarbon and HF by-products from first stage 14 react over the CaO/Z catalyst bed in vessel C during the catalytic decomposition and neutralization cycle to generate solid $CaF_2$ according to reactions (i)-(iii). Upon reaching the equilibrium limit of CaF$_2$ on the CaO/Z catalyst in vessel C, the catalytic ozonation off-gas from first stage 12 is routed to vessel D and the spent catalyst in vessel C is contacted with a mineral acid, such as HCl or HNO$_3$, to dissolve the CaF$_2$ salt and remove it as waste 36. The acid-washed zeolite catalyst is regenerated by the aforementioned calcium impregnation procedure to produce the active CaO phase.

EXAMPLE

A series of well-defined, hydrothermally stable *BEA zeolites (see sections 1 and 2) with micropores of similar size to PFOA (~6×6×12 Å) and a model PFAS compound, containing Lewis acid binding sites (Sn, Ti, Zr, Hf) to enhance PFOA adsorption through coordination of the hydrophilic carboxylic acid group to the transition metal center, were prepared. These Lewis acid zeolites will be used in the first stage of the treatment process to separate PFAS from aqueous streams and enable subsequent decomposition of the recalcitrant molecules through catalytic ozonation.

Batch adsorption experiments were performed at 298 K in 15-ml polypropylene centrifuge tubes while stirring at 600 rpm for contact times ranging from 0.25-24 h. The zeolites were evaluated for selective adsorption of PFOA from water to determine the influence of the Lewis acid metal center along with intra-zeolite transport and textural properties (hydrophobicity, hydrophilicity) on equilibrium PFOA uptake. Sample aliquots were collected at pre-determined times, filtered by syringe, mixed with an internal standard (M8PFOA, Wellington Laboratories), and then analyzed on a Thermo Scientific ultra-high sensitivity/high resolution, accurate mass (HRAM) Exactive HF Orbitrap LC-MS system.

The PFOA uptake capacity was determined according to:

$$q = \frac{(C_0 - C_e)V}{W},$$

where q is the amount of PFOA adsorbed per mass of dry adsorbent (mg$_{PFOA}$ (mg$_{ads}$)$^{-1}$); C$_0$ is the initial PFOA concentration in solution (mg$_{PFOA}$ (ml)$^{-1}$); Ce is the equilibrium PFOA concentration in solution (mg$_{PFOA}$ (ml)$^{-1}$); V is the volume of solution (ml); and W is the mass of dry adsorbent (g). The results for PFOA adsorption by Zr-, Hf-, Sn-, and Ti-*BEA after 1 h of treatment from an initial PFOA concentration of 0.04 mg ml$^{-1}$ (40 ppm) are shown in Table 1 below. All samples were able to remove >99% of the PFOA from solution with Sn-*BEA and Ti-*BEA adsorbing nearly 1 PFOA molecule per metal site. This result is supported by calculated adsorption energies from DRUV-vis spectra confirming that nearly all Sn and Ti metal sites are present as isolated, four-coordinate species bound in the zeolite framework. For Zr-*BEA and Hf-*BEA, a fraction of the metal sites are present as extra-framework oxide clusters. Following 24 h of treatment, no detectable PFOA was present in solution for any of the zeolites.

TABLE 1

Results summary for PFOA adsorption on Lewis acid *BEA zeolites in water.

| Adsorbent [a] | $C_{e, 1h}$ [b] ppb | q/mg$_{PFOA}$ (g$_{ads}$)$^{-1}$ | q/mol$_{PFOA}$ (mol$_{metal}$)$^{-1}$ | % Uptake |
|---|---|---|---|---|
| Zr-*BEA-F-68 | 0.5 | 41.4 | 0.06 | >99.9 |
| Hf-*BEA-F-101 | 103.4 | 41.3 | 0.01 | 99.7 |
| Sn-*BEA-F-83 | 66.1 | 41.3 | 0.82 | 99.8 |
| Ti-*BEA-F-110 | 1.1 | 41.4 | 0.88 | >99.9 |

[a] Denotes sample synthesized in fluoride (F) media with corresponding Si/metal molar ratio (Zr-*BEA-F, Si/Zr = 68);
[b] Equilibrium PFOA concentration in water after 1 h at 298K while stirring at 600 rpm with 50 mg of adsorbent.
Initial PFOA concentration (C$_0$) = 0.04 mg ml$^{-1}$.

Zr-*BEA was synthesized according to a modified procedure described by Zhu et al.[1] Briefly, approximately 2.5 g of tetraethylorthosilicate (TEOS, Sigma Aldrich, 99 wt %) was hydrolyzed in a 4.85 g of tetraethylammonium hydroxide solution (TEAOH, Sigma Aldrich, 20 wt %) while stirring (~300 rpm) at ambient temperature for at least 24 h. Separately, 0.32 g of ZrOCl$_2$·8H$_2$O (Sigma Aldrich, 98 wt %) was dissolved in 8 g of ASTM Type I H$_2$O (8 g) and then added dropwise to the TEOS-TEAOH solution while stirring. The combined solution was left uncovered on the stir plate to evaporate excess H$_2$O and ethanol produced from hydrolysis of TEOS. The resulting mixture was transferred to a 45-ml PTFE-lined stainless-steel autoclave (Parr Instrument Co.). Next, 2.2 g of HF$_{(aq)}$ (Sigma Aldrich, 48 wt %) was added to the mixture while mechanically stirring to produce a gel with a final composition (molar ratios) of 1.0 SiO$_2$:0.01 ZrO$_2$:0.56 TEAOH:10H$_2$O:0.56 HF. Lastly, 0.5 g of Si-*BEA seed crystals were added to the gel and the synthesis was carried out in convection oven at 140° ° C. under static conditions for 10 days.

Sn-*BEA was synthesized according to a modified procedure described by Gunther et al.[2] In a 23-ml PTFE-lined stainless-steel autoclave (Parr Instrument Co.), 20 g of TEOS (Sigma Aldrich, 99 wt %) was hydrolyzed in 39.54 g of TEAOH (Sigma Aldrich, 20 wt %) while stirring (~300 rpm) at ambient temperature for at least 24 h. Separately, 0.0276 g of SnCl$_2$·2H$_2$O (Sigma Aldrich, 98 wt %) was dissolved in 4 g of ASTM Type I H$_2$O (8 g) and then added dropwise to the TEOS-TEAOH solution while stirring. The combined solution was left uncovered on the stir plate to evaporate excess H$_2$O and ethanol produced from hydrolysis of TEOS. Next, 0.27 g of HF$_{(aq)}$ (Sigma Aldrich, 48 wt %) was added to the mixture while mechanically stirring to produce a gel with a final composition (molar ratios) of 1.0 SiO$_2$:0.01 SnCl$_2$:0.55 TEAOH:7.52H$_2$O:0.54 HF. Lastly, 0.05 g of Si-*BEA seed crystals were added to the gel and the synthesis was carried out in convection oven at 140° C. under static conditions for 30 days.

Ti-*BEA was synthesized according to a modified procedure described by Cordon et al.[3] In a 23-ml PTFE-lined stainless-steel autoclave (Parr Instrument Co.), 6 g of TEOS (Sigma Aldrich, 99 wt %) was hydrolyzed in 11.66 g of TEAOH (Sigma Aldrich, 20 wt %) while stirring (~300 rpm) at ambient temperature for at least 24 h. Then, 0.0692 g of tetraethyl orthotitanate (Sigma Aldrich 95 wt %) was added dropwise to the TEOS-TEAOH solution while stirring. The combined solution was left uncovered on the stir plate to evaporate excess H$_2$O and ethanol produced from hydrolysis of TEOS. Next, 0.66 g of HF$_{(aq)}$ (Sigma Aldrich, 48 wt %) was added to the mixture while mechanically stirring to produce a gel with a final composition (molar ratios) of 1.0 SiO$_2$:0.01 TiO$_2$:0.55 TEAOH:6.62H$_2$O:0.55 HF. Lastly, 0.44 g of Si-*BEA seed crystals were added to the gel and the synthesis was carried out in convection oven at 140° C. under static conditions for 14 days.

The solid products resulting from each synthesis mixture were separated from the supernatant by centrifugation (4,500 rpm, 5 min), and then washed with acetone and distilled $H_2O$ in alternating wash/centrifuge/decant cycles (2 washes with each solvent, ~15 ml solvent per wash). The solids were dried in air at 100° ° C. for 24 h, and then calcined at 580° ° C. with a 1° ° C. $min^{-1}$ ramp for 8 h and a 3 h isothermal step at 150° C.

Powder X-ray diffraction (PXRD) patterns were collected on a Rigaku MiniFlex 600 6G X-ray diffractometer with a Cu Kα (λ=1.5418 Å) source by using a step size of 0.005 degree and scan speed of 0.5 degree $min^{-1}$. Elemental analysis was performed by inductively coupled plasma mass spectroscopy (ICP-MS) with a PerkinElmer Elan DRC-e ICP Mass Spectrometer.

Diffuse reflectance ultraviolet-visible (DRUV-vis) spectra were recorded on a Thermo Scientific Evolution 300 UV-vis spectrometer equipped with Praying Mantis Diffuse Reflectance accessory (Herrick, HVC-M-12) and a $BaSO_4$ reference to calculate absorption energies and verify isomorphous substitution of the metal center into the zeolite framework. The calcined samples were loaded into the Praying Mantis accessory under He flow (100 ml $min^{-1}$), dried at 250° C. for 3 h, and then examined at 150° C. and 25° C.

What is claimed is:

1. A method of destroying recalcitrant perfluoroalkyl substances, comprising the steps of:
    feeding an aqueous stream containing PFAS to a first vessel containing an adsorption bed formed from a porous, hydrophobic, hydrothermally stable molecular sieve;
    draining the aqueous stream from the first vessel;
    introducing compressed air into the first vessel;
    raising a temperature of the adsorption bed to between 80 and 120 degrees Celsius until the adsorption bed is dry;
    increasing the temperature of the adsorption bed to above 150 degrees Celsius;
    introducing an amount of ozone into the first vessel;
    providing any off-gases from the first vessel to a second vessel having a catalytic bed formed from a zeolite-supported CaO catalyst;
    oxidizing any off-gases from the second vessel with a catalytic oxidizer coupled to the second vessel and having a metal-oxide supported noble catalyst operating at a temperature of between 200 and 350 degrees Celsius.

2. The method of claim 1, further comprising the step of washing the catalytic bed of the second vessel with a mineral acid to dissolve any salt.

3. The method of claim 2, further comprising the step of regenerating the catalytic bed of the second vessel with calcium impregnation.

4. The method of claim 3, wherein the porous, hydrophobic, hydrothermally stable molecular sieve comprises a silica zeolite having a silica to metal ratio greater than 6 and a *BEA topology with a higher concentration of fully-coordinated molecular binding sites than partially-hydrolyzed open sites.

5. The method of claim 4, wherein the *BEA topology includes tetravalent metal heteroatoms.

6. The method of claim 5, wherein the zeolite-supported CaO catalyst of the second vessel is impregnated with a $H_2O$-soluble calcium precursor.

7. The method of claim 6, wherein the $H_2O$-soluble calcium precursor comprises calcium acetate ($Ca(C_2H_3O_2)_2$).

8. The method of claim 7, wherein the metal-oxide supported noble catalyst is selected from group consisting of Pt, Pd on $CeO_2$, and $Al_2O_3$.

9. The method of claim 8, wherein the mineral acid comprises HCl or $HNO_3$.

* * * * *